UNITED STATES PATENT OFFICE.

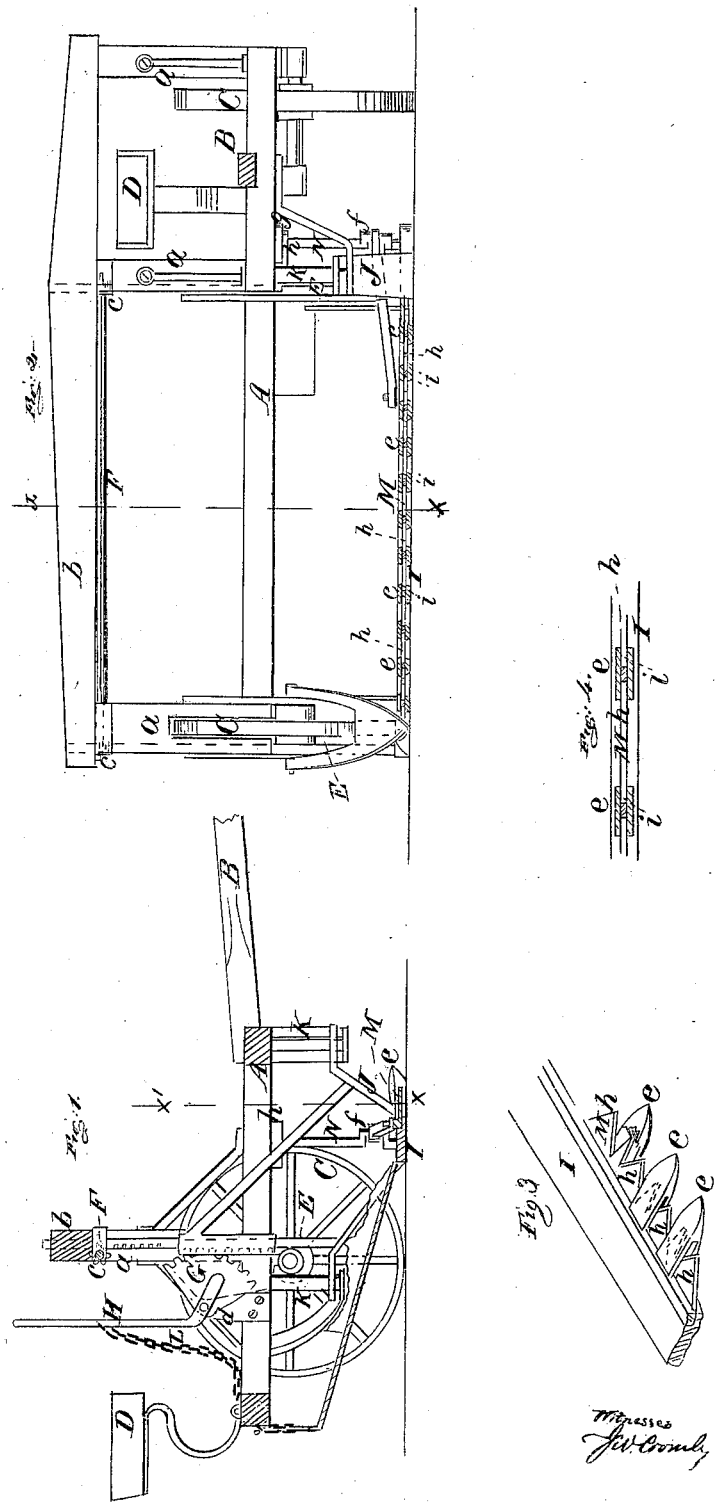

J. B. TINKER, OF PLYMOUTH, NEW YORK.

IMPROVEMENT IN HARVESTERS.

Specification forming part of Letters Patent No. 31,339, dated February 5, 1861.

*To all whom it may concern:*

Be it known that I, J. B. TINKER, of Plymouth, in the county of Chenango and State of New York, have invented a new and Improved Grain and Grass Harvester; and I do hereby declare that the following is a full, clear, and exact description of the same, reference being had to the annexed drawings, making a part of this specification, in which—

Figure 1 is a side sectional view of my invention, taken in the line $x\,x$, Fig. 2; Fig. 2, a vertical section of same, taken in the line $x'\,x'$, Fig. 1; Fig. 3, a detached perspective view of a portion of the cutting device; Fig. 4, a detached section of the same, taken in the line $x'\,x'$, Fig. 1.

Similar letters of reference indicate corresponding parts in the several figures.

To enable those skilled in the art to fully understand and construct my invention, I will proceed to describe it.

A represents the frame of the machine, to which there are attached vertical bars $a$, having their upper ends connected by a cross-bar, $b$.

To the left-hand side of the frame A the draft-pole B is attached, and each side of the frame is supported by a wheel, C, both of which are shown in Fig. 2. At the back part of the frame A, and at a point nearly in line with the draft-pole B, the driver's seat D is attached.

In one side of two of the upright bars $a$ there are fitted bars E, one rack in each upright bar. These rack-bars are allowed to slide or work freely in the uprights $a$, and into the rack-bars pinions $c\,c$ gear, one pinion gearing into each bar. The pinions $c\,c$ are fitted on one and the same shaft, F, which extends along underneath the cross-bar $b$. (See Figs. 1 and 2.) Into one of the rack-bars E—the one nearest the driver's seat D—a segment, G, gears. This segment has its fulcrum-pin passing through an upright, $d$, on the frame A, and to the segment a lever, H, is attached, which lever extends back within reach of the driver on seat D. The rack-bars E E extend down below the uprights $a$, and the outermost one is curved at its lower part and is attached directly to a finger-bar, I. The other rack-bar is perfectly straight throughout, and is attached at its lower end to a bent bar, J, the ends of which are fitted on pendent guides K K, attached to the frame A. (See Fig. 1.) The inner end of the finger-bar is attached to the bar J. By operating the segment G both rack-bars E E will be moved simultaneously, in consequence of their connection by the pinions $c\,c$ and shaft F, and the finger-bar I will therefore be raised and lowered bodily and in a horizontal position by operating the segment. By thus operating the finger-bar, and consequently the sickle, the frame of the machine will not be affected in the least, and the sickle may be raised with the greatest facility by the driver from his seat. The sickle may be retained at any desired point by means of a chain, L, attached to the lever H and the back part of the frame A.

M is a sickle, which is fitted in the fingers $e$, attached to the bar J. The fingers $e$ may be of the usual form, the sickle being fitted in the slots of the fingers and working back and forth therein. The sickle is operated by a crank, $f$, on an upright shaft, N, the lower end of which is attached to one end of the finger-bar J. This shaft N passes through a pinion, $g$, which is fitted in a socket, $h$, attached to frame A, the shaft being connected to the pinion by a feather and groove. The shaft N is rotated from one of the wheels C through the medium of gearing, of which the pinion $g$ forms a part, and as the sickle and finger-bar are raised and lowered the shaft N is allowed to slide through the pinion $g$ while being rotated by it. The raising and lowering of the sickle therefore will not affect in the least its driving mechanism. The crank-shaft N is placed slightly to the rear of the sickle M, and connects with it through the medium of a rod, $m$, passing from the crank $f$, near the lower end of the shaft, to a stud projecting upward from the sickle. The sickle M and rod $m$ are substantially parallel at any elevation of the finger-bar, and by casting off the rod the sickle may be readily withdrawn without displacing any other part of the machine. The fingers $e$ are attached to the bar I at equal distances apart, the length of said distances being such that the teeth $h$ of the sickle will vibrate between the fingers but not pass through them, the cutting-edge of each tooth merely passing into the recesses or slots of its adjoining fingers. Between the teeth $h$ of the sickle there are pointed or V-shaped projections $i$, which work in the slots of the fingers and traverse the whole length of them without passing out therefrom, and they keep the slots or recesses perfectly free from all substances which may chance to enter them. The edges or sides of the projections $i$ may be perfectly square or vertical, as they are not designed to cut like the teeth $h$, the latter having beveled sides, in order to form cutting-edges. The projections $i$ therefore will keep the fingers perfectly free, and the action of the cutters will always be perfect. This arrangement admits of a quick cutting action of the sickle without the possibility of its choking or clogging.

Having thus described my invention, what I claim as new, and desire to secure by Letters Patent, is—

The combination of the toothed segment G, rack-bars E E, shaft F, pinions $cc$, bent brace-rod J, guides K K, grooved crank-shaft N, and feathered pinion $g$, the said parts being constructed and arranged in connection with the rigid frame A $a b$, wheels C, finger-bar I, and sickle M, in the manner and for the purposes herein shown and described.

J. B. TINKER.

Witnesses:
JAMES M. SABIN,
DENNIS BALLOU.